(12) United States Patent
Zhu et al.

(10) Patent No.: US 11,799,993 B2
(45) Date of Patent: Oct. 24, 2023

(54) TERMINAL DEVICE

(71) Applicant: VIVO MOBILE COMMUNICATION CO., LTD., Chang'an Dongguan (CN)

(72) Inventors: Lei Zhu, Chang'an Dongguan (CN); Shuang Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 165 days.

(21) Appl. No.: 17/362,165

(22) Filed: Jun. 29, 2021

(65) Prior Publication Data
US 2021/0352165 A1 Nov. 11, 2021

Related U.S. Application Data

(63) Continuation of application No. PCT/CN2019/124529, filed on Dec. 11, 2019.

(30) Foreign Application Priority Data

Dec. 29, 2018 (CN) .......................... 201811639144.6

(51) Int. Cl.
*G06F 1/16* (2006.01)
*H04M 1/02* (2006.01)
(52) U.S. Cl.
CPC ........ *H04M 1/0216* (2013.01); *G06F 1/1618* (2013.01); *G06F 1/1652* (2013.01);
(Continued)
(58) Field of Classification Search
CPC ............. H04M 1/0216; H04M 1/0249; H04M 1/0268; H04M 2250/16; H04M 2250/54;
(Continued)

(56) References Cited

U.S. PATENT DOCUMENTS 6,262,885 B1 * 7/2001 Emma ................... G06F 1/1618
361/679.05
7,599,181 B2 * 10/2009 Chuang ................. H04M 1/022
361/679.55
(Continued)

FOREIGN PATENT DOCUMENTS

CN 101426033 A 5/2009
CN 102591464 A 7/2012
(Continued)

OTHER PUBLICATIONS

Extended European Search Report for related Application No. 19906258.9; reported on Jan. 17, 2022.
(Continued)

*Primary Examiner* — Rockshana D Chowdhury
(74) *Attorney, Agent, or Firm* — von Briesen & Roper, s.c.

(57) ABSTRACT

The present disclosure discloses a terminal device, including at least two folding portions, a rotational shaft, and a telescopic device, where each of the folding portions includes a housing and a display screen arranged on the housing, each housing is provided with the rotational shaft, two adjacent folding portions are connected to each other by the telescopic device, two ends of the telescopic device are respectively connected to the rotational shafts on the two adjacent folding portions, the terminal device has a folded state and an extended state, in the folded state, two adjacent folding portions are folded, and in the extended state, display screens of the two adjacent folding portions abut on each other and are coplanar.

9 Claims, 4 Drawing Sheets

(52) U.S. Cl.
CPC ........ *G06F 1/1673* (2013.01); *H04M 1/0249* (2013.01); *H04M 1/0268* (2013.01)

(58) Field of Classification Search
CPC ............. H04M 1/0235; H04M 1/0247; H04M 1/0206; H04M 1/0214; H04M 1/026; H04M 1/0264; H04M 1/0266; G06F 1/1618; G06F 1/1652; G06F 1/1673; G06F 1/1624; G06F 1/1641; G06F 3/0426; G06F 1/1616

See application file for complete search history.

(56) References Cited

U.S. PATENT DOCUMENTS

| | | | | |
|---|---|---|---|---|
| 8,964,365 | B2* | 2/2015 | Kim | G06F 1/1624 |
| | | | | 361/679.04 |
| 9,277,659 | B2* | 3/2016 | Onda | H05K 5/0217 |
| 11,335,302 | B2* | 5/2022 | Rojas | G06F 3/04845 |
| 2006/0128449 | A1* | 6/2006 | Park | H04M 1/0237 |
| | | | | 455/575.4 |
| 2008/0311963 | A1 | 12/2008 | Strawn | |
| 2018/0054501 | A1 | 2/2018 | Lin | |
| 2018/0267685 | A1* | 9/2018 | Zhang | G06F 1/1626 |
| 2020/0117233 | A1* | 4/2020 | Ou | H04B 1/3827 |
| 2021/0135492 | A1* | 5/2021 | Kim | H02J 50/10 |
| 2022/0117101 | A1* | 4/2022 | Lee | H04M 1/0237 |

FOREIGN PATENT DOCUMENTS

| | | |
|---|---|---|
| CN | 104158926 A | 11/2014 |
| CN | 105516411 A | 4/2016 |
| CN | 107395816 A | 11/2017 |
| CN | 109547603 A | 3/2019 |
| EP | 2600594 A1 | 6/2013 |
| WO | 20160008199 A1 | 1/2016 |

OTHER PUBLICATIONS

Office Action dated Feb. 2, 2020 in relation to 201811639144.6.
Written Opinion and International Preliminary Report on Patentability dated Jul. 8, 2021, in relation to PCT1900966CN.

* cited by examiner

TERMINAL DEVICE

CROSS-REFERENCE OF RELATED APPLICATION

This application is a continuation application of International Application No. PCT/CN2019/124529 filed on Dec. 11, 2019, which claims priority to Chinese Patent Application No. 201811639144.6 filed in China on Dec. 29, 2018, both disclosures of which are incorporated herein by reference in their entireties.

TECHNICAL FIELD

The present disclosure relates to the technical field of communication devices, and in particular, to a terminal device.

BACKGROUND

As user requirements become higher, large-screen terminal devices are popular among users. A larger screen area can not only improve appearance of terminal devices, but also can improve display of terminal devices.

As is known, portability of terminal devices is an important feature, which is convenient for users during usage. Therefore, during a design process, the entire sizes of terminal devices cannot be increased blindly. Under the premise that overall sizes of terminal devices are determinate, how to increase screen areas without affecting portability is an important direction for current research and development of manufacturers.

SUMMARY

The present disclosure discloses a terminal device, to increase screen areas of terminal devices without affecting portability.

To solve the above problem, the present disclosure adopts the following technical solution:

A terminal device includes at least two folding portions, a rotational shaft, and a telescopic device, where each of the folding portions includes a housing and a display screen arranged on the housing, each housing is provided with the rotational shaft, two adjacent folding portions are connected to each other by the telescopic device, two ends of the telescopic device are respectively connected to the rotational shafts on the two adjacent folding portions, the terminal device has a folded state and an extended state, in the folded state, two adjacent folding portions are folded, and in the extended state, display screens of the two adjacent folding portions abut on each other and are coplanar.

The technical solution adopted in the present disclosure can achieve the following beneficial effects:

In the terminal device disclosed in the present disclosure, two adjacent folding portions are connected by the telescopic device, and two ends of the telescopic device are respectively connected to the rotational shafts on the two adjacent folding portions. In this way, the telescopic device expands and contracts and rotates relative to the folding portion connected to the telescopic device, so that the terminal device switches between the folded state and the extended state. It can be seen that portability of the terminal device disclosed by the present disclosure can be ensured through folding, and the screen area of the terminal device can be increased through extending.

BRIEF DESCRIPTION OF DRAWINGS

The accompanying drawings illustrated herein are provided to further understand the present disclosure and form a part of the present disclosure. The exemplary embodiments of the present disclosure and the descriptions thereof are used to explain the present disclosure and do not constitute an improper limitation on the present disclosure. In the accompanying drawings.

DESCRIPTION OF REFERENCE NUMERALS IN THE ACCOMPANYING DRAWING

Figure 1:
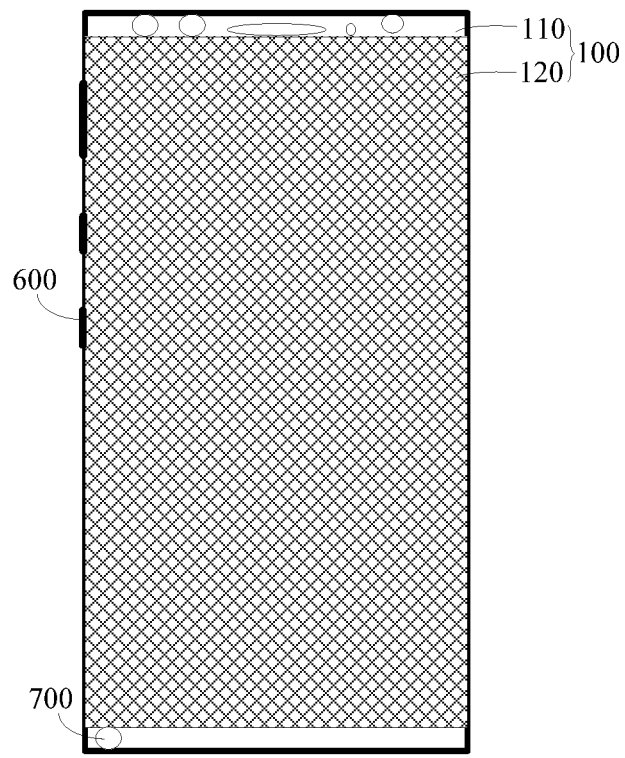
FIG. 1 is a schematic structural diagram in which a terminal device is in a folded state according to an embodiment of the present disclosure.

100—folding portion, 110—housing, 111—first positioning groove, 112—second positioning groove, 113—headphone hole, 114—speaker, 120—display screen, 200—folding portion, 210—housing, 211—first positioning groove, 212—second positioning groove, 213—USB port, 220—display screen, 300—folding portion, 310—housing, 311—first positioning groove, 312—second positioning groove, 313—speaker, 320—display screen, 400—rotational shaft, 500—telescopic device, 600—control key, 700—first optical signal transceiver apparatus, 800—second optical signal transceiver apparatus, and 900—light-sensitive projection virtual keyboard.

DETAILED DESCRIPTION OF EMBODIMENTS

To make the objectives, technical solutions, and advantages of the present disclosure clearer, the following clearly describes the technical solutions in the present disclosure with reference to specific embodiments of the present disclosure and the corresponding accompanying drawings. Apparently, the described embodiments are some rather than all of the embodiments of the present disclosure. All other embodiments obtained by a person of ordinary skill in the art based on the embodiments of the present disclosure shall fall within the protection scope of the present disclosure.

The technical solutions disclosed in the embodiments of the present disclosure are described in detail with reference to the accompanying drawings.

Referring to FIG. 1 to FIG. 5, the embodiments of the present disclosure disclose a terminal device. The disclosed terminal device includes at least two folding portions (for example, a folding portion 100, a folding portion 200, and a folding portion 300), a rotational shaft 400, and a telescopic device 500.

Each folding portion includes a housing and a display screen arranged on the housing. For example, the folding portion 100 includes a housing 110 and a display screen 120 arranged on the housing 110, the folding portion 200 includes a housing 210 and a display screen 220 arranged on the housing 210, and the folding portion 300 include a housing 310 and a display screen 320 arranged on the housing 310.

Each housing is provided with the rotational shaft 400, and the rotational shaft 400 can rotate relative to the housing. Each two adjacent folding portions are connected by the telescopic device 500. Specifically, two ends of the telescopic device 500 are connected to the rotational shafts 400 on the two adjacent folding portions, that is, housings of the folding portions can rotate in cooperation with the ends of the telescopic device 500 through the rotational shaft 400. The two ends of the telescopic device 500 can rotate relative to the housing of the folding portion through the rotational shaft 400, and the telescopic device 500 can expand and contract, to adapt to deformation of the terminal device in the process of switching between the folded state and the extended state.

Figure 2:
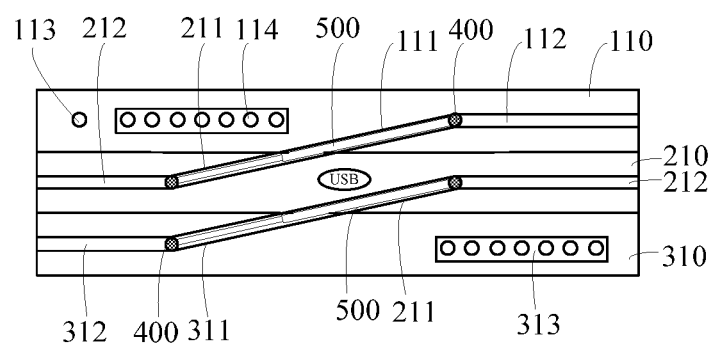
FIG. 2 is a schematic structural diagram of a bottom end surface when a terminal device is in a folded state according to an embodiment of the present disclosure.
Figure 3:
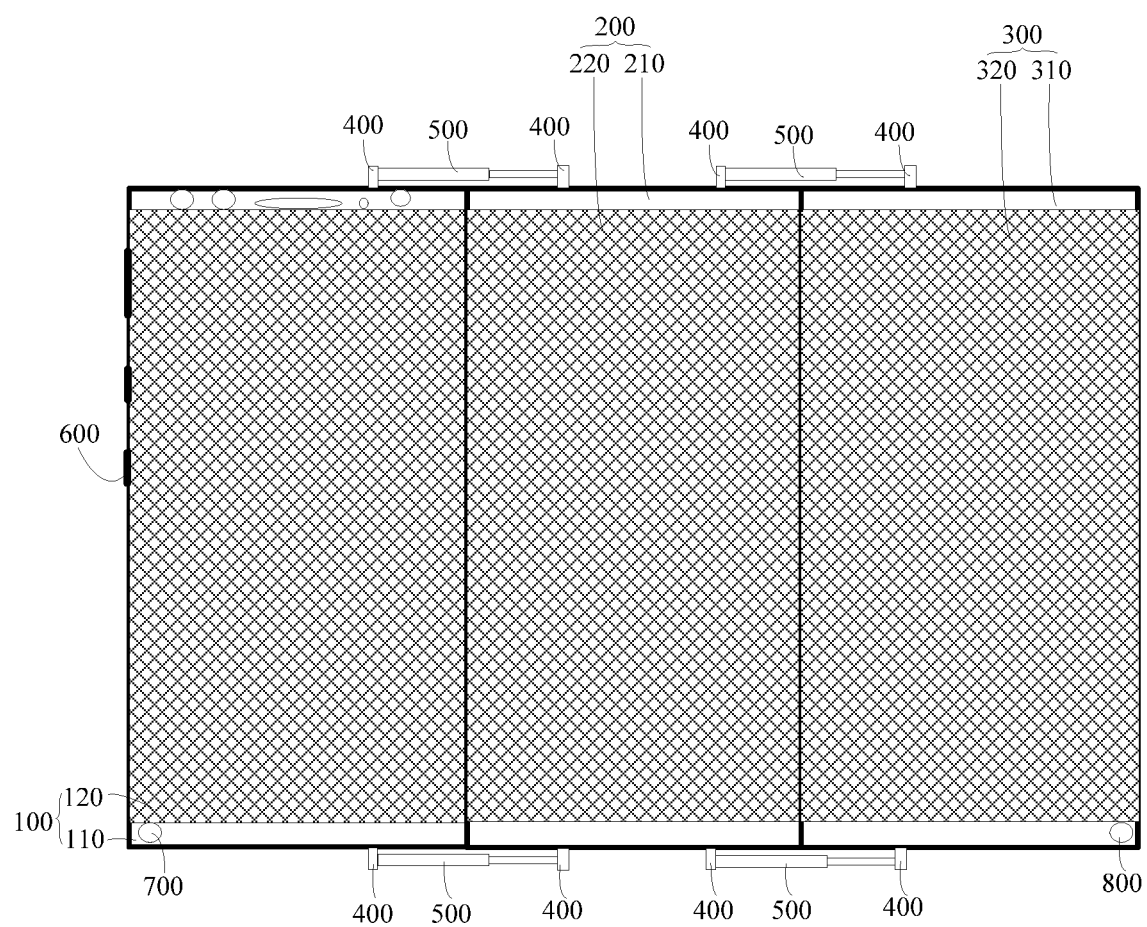
FIG. 3 is a schematic structural diagram in which a terminal device is in an extended state according to an embodiment of the present disclosure.

The terminal device disclosed in the embodiments has the folded state and the extended state, thereby adjusting the size of the terminal device. In the folded state, two adjacent folding portions are folded, as shown in FIG. 1 and FIG. 2, so that the overall size of the terminal device can be reduced. In the extended state, display screens of the two adjacent folding portions abut on each other and are coplanar, so that a larger area of the display screen can be formed.

The usage process of the terminal device disclosed in the embodiments of the present disclosure is as follows:

In the process from the folded state to the extended state, one of the two adjacent folding portions can move to one side relative to the other folding portion. In this process, because the telescopic device 500 can expand and contract and two ends of the telescopic device 500 can rotate through the rotational shaft 400, the telescopic device 500 expands and contracts and rotates, to extend the two adjacent folding portions and finally enable the terminal device to enter the extended state.

In the process from the extended state to the folded state, the user can fold two adjacent folding portions, and during this process, the telescopic device 500 expands and contracts and rotates, to fold the two adjacent folding portions and finally enable the terminal device to enter the folded state.

As can be seen from the foregoing operation process, in the terminal device disclosed in the embodiments of the present disclosure, two adjacent folding portions are connected by the telescopic device 500, and two ends of the telescopic device 500 are respectively connected to the rotational shafts 400 on the two adjacent folding portions. In this way, the telescopic device 500 expands and contracts and rotates relative to the folding portion connected to the telescopic device 500, so that the terminal device switches between the folded state and the extended state. It can be seen that portability of the terminal device disclosed by the embodiments of the present disclosure can be ensured through folding, and the screen area of the terminal device can be increased through extending.

In a more optional solution, each housing may be provided with a first positioning groove, for example, the housing 110 is provided with a first positioning groove 111; the housing 210 is provided with a first positioning groove 211; and the housing 310 is provided with a first positioning groove 311. The housing 110 can be further provided with a headphone hole 113 and a speaker 114, the housing 210 can be further provided with a USB port 213, and the housing 310 can be provided with a speaker 313. The rotational shaft 400 can be mounted in the first positioning groove.

When the terminal device is in the folded state, first positioning grooves of two adjacent housings are connected and form a first accommodating space. The rotational shaft 400 moves in cooperation with the housing of the rotational shaft 400 in the axial direction of the rotational shaft 400, and the telescopic device 500 can enter or exit the first accommodating space along with the movement of the rotational shaft 400. In the folded state, two adjacent folding portions are folded. In this case, the telescopic device 500 can be located in the first accommodating space, and the telescopic device 500 can maintain the folded state of the two adjacent folding portions, as shown in FIG. 2. When the terminal device needs to be extended, the rotational shaft 400 can move to drive the telescopic device 500 to move out of the first accommodating space to remove restriction.

Similarly, each housing can be provided with a second positioning groove, for example, the housing 110 is provided with a second positioning groove 112, the housing 210 is provided with a second positioning groove 212, and the housing 310 is provided with the second positioning groove 312. The rotational shaft 400 can be mounted in the second positioning groove.

Figure 4:
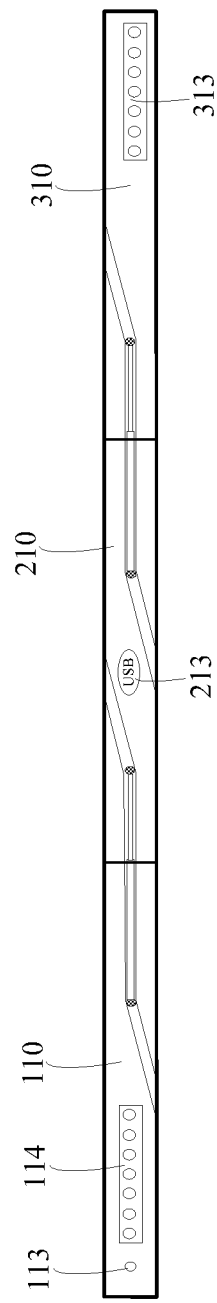
FIG. 4 is a schematic structural diagram of a bottom end surface when a terminal device is in an extended state according to an embodiment of the present disclosure.
Figure 5:
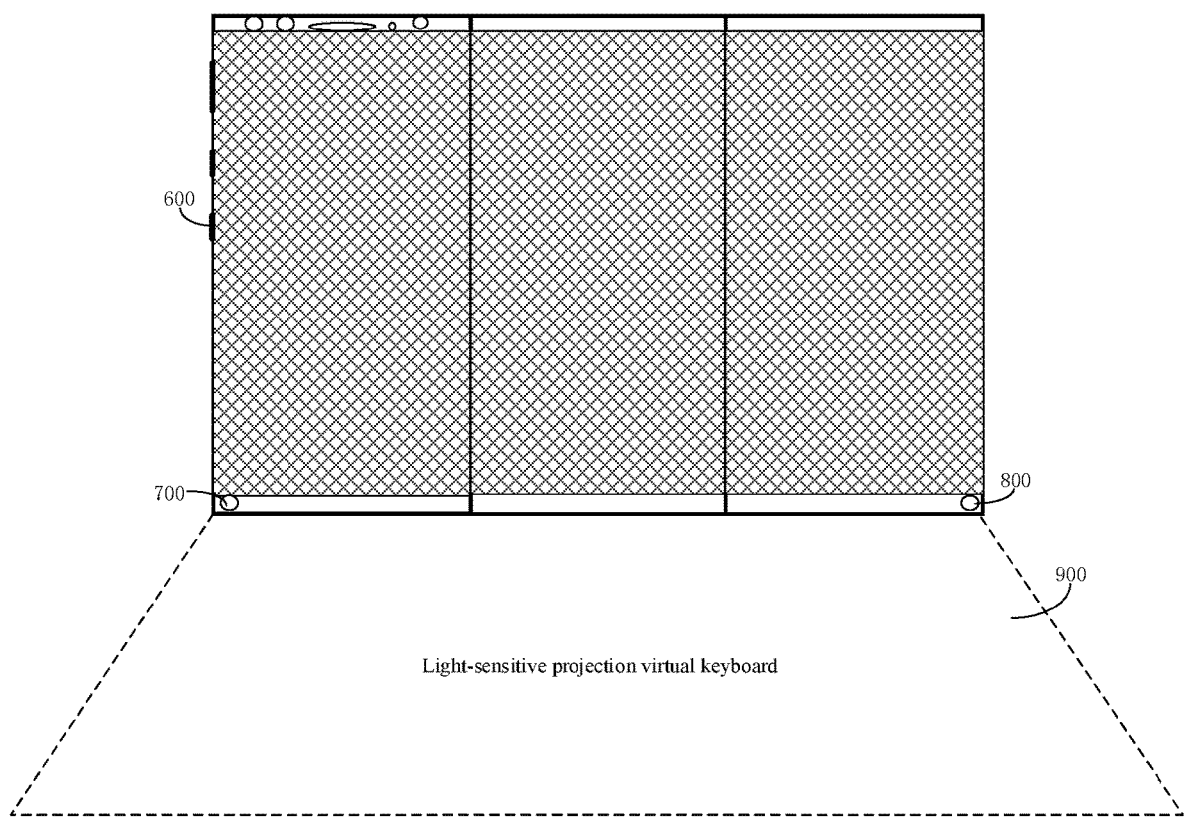
FIG. 5 is a schematic diagram of application of a terminal device according to an embodiment of the present disclosure.

When the terminal device is in the extended state, the second positioning grooves of the two adjacent housings are connected and form a second accommodating space. The telescopic device 500 can enter or exit the second accommodating space along with the movement of the rotational shaft 400. In the extended state, the second positioning grooves of the two adjacent housings are connected and form the second accommodating space, the telescopic device 500 can be located in the second accommodating space, and the telescopic device 500 can maintain the extended state of the two adjacent folding portions, as shown in FIG. 4. When the terminal device needs to be folded, the rotational shaft 400 can move to drive the telescopic device 500 to move out of the second accommodating space to remove restriction.

To facilitate the telescopic device 500 in cooperation with the first accommodating space and the second accommodating space in the folded state and the extended state, in a more optional solution, the second positioning groove and the first positioning groove provided in each housing are connected. In the process from the folded state to the extended state, a user can move the rotational shaft 400 to move the telescopic device 500 out of the first accommodating space. In this case, the function of maintaining the folded state by the telescopic device 500 is disabled. In the process from the extended state to the folded state, a user can move the rotational shaft 400 to move the telescopic device 500 out of the second accommodating space. In this case, the function of maintaining the extended state by the telescopic device 500 is disabled. The telescopic device 500 cooperates with the first accommodating space and the second accommodating space, so that the terminal device can be more stably maintained in the folded state and the extended state.

The rotational shaft 400 may be provided in the first positioning groove or the second positioning groove. In the embodiments, the first positioning groove and the second positioning groove included in the housing can satisfy cooperation requirements in the foregoing states. The first positioning groove and the second positioning groove included in each housing can have a variety of structures. Referring to FIG. 2 and FIG. 4 again, in a specific implementation, the second positioning groove 112 may extend along a plane of the folding portion 100, one end of the first positioning groove 111 may be connected to the second positioning groove 112, and the other end of the first positioning groove 111 may extend to a plane of a board surface of the folding portion 100.

Movement of the rotational shaft 400 relative to the housing can be implemented by manual control. Specifically, a user can push and pull the telescopic device 500 to implement the movement. To facilitate the control, in an optional solution, a drive structure can be provided in the housing. The drive structure is connected to the rotational shaft 400, and the drive structure is used to drive the rotational shaft 400 to move along the axis direction of the rotational shaft 400. In a specific implementation, the drive structure may be a linear motor.

In the terminal device disclosed in the embodiments, there are at least three folding portions. In a specific implementation, there may be three folding portions. In the extended state, the at least three folding portions include two end folding portions and one middle folding portion located between the two end folding portions, a side surface or an end surface of the end folding portion may be provided with a control key 600, the control key 600 may be connected to the drive structure, and the control key 600 may control start or stop of the drive structure, to indirectly control the telescopic device 500 to move into or out of the first accommodating space or the second accommodating space.

When the terminal device is in the extended state, an area of a display interface formed is larger. When the terminal device is in the folded state, a user can also use a display screen of a folding portion at the uppermost layer. In a more optional solution, the terminal device disclosed in the embodiments of the present disclosure may also include a first optical signal transceiver apparatus 700 and a second optical signal transceiver apparatus 800. An optical signal projected by the first optical signal transceiver apparatus 700 and an optical signal projected by the second optical signal transceiver apparatus 800 form a light-sensitive projection virtual keyboard 900. When the first optical signal transceiver apparatus 700 and the second optical signal transceiver apparatus 800 sense that a same area of the light-sensitive projection virtual keyboard 900 is blocked, keyboard information corresponding to the blocked area is input into the terminal device as input information. In this case, the user can directly use the terminal device in the extended state as a notebook computer.

It should be noted that both the first optical signal transceiver apparatus 700 and the second optical signal transceiver apparatus 800 can project to form light-sensitive projection virtual keyboards 900. This technology is a well-known technology. Light-sensitive projection virtual keyboards 900 formed by projection of the first optical signal transceiver apparatus 700 and the second optical signal transceiver apparatus 800 overlap each other. Because light sensing angles of the first optical signal transceiver apparatus 700 and the second optical signal transceiver apparatus 800 are different, the first optical signal transceiver apparatus 700 and the second optical signal transceiver apparatus 800 can perform mutual verification. When the user controls the light-sensitive projection virtual keyboard 900, only when both the first optical signal transceiver apparatus 700 and the second optical signal transceiver apparatus 800 sense that a certain area of the light-sensitive projection virtual keyboard 900 is blocked, it can be determined that a user finger is in that area. An area blocked by a user palm can be determined as a blocked area by only one of the first optical signal transceiver apparatus 700 and the second optical signal transceiver apparatus 800. In this case, interference of the user palm can be avoided.

Similarly, the technology of sensing by the first optical signal transceiver apparatus 700 and the second optical signal transceiver apparatus 800 that a part of the light-sensitive projection virtual keyboard 900 is blocked is also a related technology, and will not be repeated herein.

In an optional solution, a length-width ratio of the display interface of the terminal device in the extended state can be 16:9, and the ratio of the display interface is the same as that of a commonly used notebook or tablet computer and can certainly improve user usage experience.

In the embodiments, the telescopic device 500 can expand and contract and the two ends of the telescopic device 500 are respectively connected to the rotational shaft 400 on the adjacent folding portion. The telescopic device 500 expands and contracts and the two ends of the telescopic device 500 are respectively connected to the rotational shafts 400 that can rotate on two housings, to better adapt to change of relative positions of the two adjacent folding portions during switching between the extended state and the folded state. Specifically, the telescopic device 500 may be a telescopic pull-rod, or may be a hydraulic telescopic part, a pneumatic telescopic part, or the like. The embodiments of the present disclosure do not limit a specific type of the telescopic device 500.

To implement communication connection between the folding portions, in an optional solution, each of the folding portions includes a wireless transceiver apparatus configured to exchange information with another folding portion. Generally, each of the folding portions includes a battery for power supply. Certainly, the telescopic device 500 and the rotational shaft 400 can be hollow structures, and the two adjacent folding portions can be electrically connected by a cable passing through the telescopic device 500 and the rotational shaft 400, thereby implementing power supply connection or communication connection. Certainly, in this case, there is no need to provide a battery or a motherboard in each folding portion, so that some devices can be shared.

In the embodiments, the housing located at the bottom of the terminal device in the folded state may be provided with at least one of a rear-facing camera, a flash, a photosensitive device, and a fingerprint module, to implement a corresponding function of the terminal device.

The terminal device disclosed in the embodiments of the present disclosure may be a mobile phone, a tablet computer, an e-book reader, a game console, or the like. The embodiments of the present disclosure do not limit a specific type of the terminal device.

The above embodiments of the present disclosure mainly describe the differences between various embodiments. As long as the different optimization features of the various embodiments are not contradictory, the various embodiments can be combined to form a better embodiment. Considering the brevity of the text, details are not described herein again.

The foregoing descriptions are merely embodiments of this disclosure, but are not intended to limit this disclosure. For a person skilled in the art, the present disclosure may have various changes and variations. Any modification, equivalent replacement, or improvement made without departing from the spirit and principle of this disclosure shall fall within the scope of claims of this disclosure.

The invention claimed is:

1. A terminal device, comprising at least two folding portions, a rotational shaft, and a telescopic device, wherein each of the folding portions comprises a housing and a display screen arranged on the housing, each housing is provided with the rotational shaft, two adjacent folding portions are connected to each other by the telescopic device, two ends of the telescopic device are respectively connected to the rotational shafts on the two adjacent folding portions, the terminal device has a folded state and an extended state, in the folded state, two adjacent folding portions are folded, and in the extended state, display screens of the two adjacent folding portions abut on each other and are coplanar;

wherein each housing is provided with a first positioning groove, in the folded state, the first positioning grooves of two adjacent housings are connected and form a first accommodating space, the rotational shaft moves in coordination with the housing of the rotational shaft in an axial direction of the rotational shaft, and the telescopic, device can move into or move out of the first accommodating space along with the movement of the rotational shaft.

2. The terminal device according to claim 1, wherein each housing is provided with a second positioning groove connected to the first positioning groove, the rotational shaft is mounted in the first positioning groove or the second positioning groove, in the extended state, the second positioning grooves of the two adjacent housings are connected and form a second accommodating space, and the telescopic device can move in or move out of the second accommodating space along with the movement of the rotational shaft.

3. The terminal device according to claim 2, wherein the second positioning groove extends along a plane of the folding portion, one end of the first positioning groove is connected to the second positioning groove, and the other end of the first positioning groove extends to a plane of a board surface of the folding portion.

4. The terminal device according to claim 1, wherein the housing is provided with a drive structure, the drive structure is connected to the rotational shaft, and the drive structure drives the rotational shaft to move in an axis direction of the rotational shaft.

5. The terminal device according to claim 4, wherein there are at least three folding portions, in the extended state, the at least three folding portions comprise two end folding portions and at least one middle folding portion located between the two end folding portions, a side surface or an end surface of the end folding portion is provided with a control key, the control key is connected to the drive structure, and the control key controls start or stop of the drive structure.

6. The terminal device according to claim 1, further comprising a first optical signal transceiver apparatus and a second optical signal transceiver apparatus, wherein an optical signal projected by the first optical signal transceiver apparatus and an optical signal projected by the second optical signal transceiver apparatus form a light-sensitive projection virtual keyboard.

7. The terminal device according to claim 1, wherein the telescopic device is a telescopic pull-rod.

8. The terminal device according to claim 1, wherein each of the folding portions comprises a wireless transceiver apparatus configured to exchange information with another folding portion.

9. The terminal device according to claim 1, wherein the housing located at the bottom of the terminal device in the folded state is provided with at least one of a rear-facing camera, a flash, a photosensitive device, and a fingerprint module.

* * * * *